(12) United States Patent
Harnetiaux et al.

(10) Patent No.: US 7,644,780 B2
(45) Date of Patent: Jan. 12, 2010

(54) METHOD AND APPARATUS FOR A FOLDING MARKER FOR AN AGRICULTURAL IMPLEMENT

(75) Inventors: Travis L. Harnetiaux, Joliet, IL (US); Leonard A. Bettin, La Grange Park, IL (US)

(73) Assignee: CNH America, LLC., New Holland, PA (US)

( * ) Notice: Subject to any disclaimer, the term of this patent is extended or adjusted under 35 U.S.C. 154(b) by 111 days.

(21) Appl. No.: 11/779,621

(22) Filed: Jul. 18, 2007

(65) Prior Publication Data

US 2009/0020298 A1    Jan. 22, 2009

(51) Int. Cl.
*A01B 69/02*    (2006.01)
(52) U.S. Cl. .................... 172/130; 172/456
(58) Field of Classification Search ......... 172/126–132, 172/456, 311
See application file for complete search history.

(56) References Cited

U.S. PATENT DOCUMENTS

| | | | | |
|---|---|---|---|---|
| 2,175,282 A | * | 10/1939 | Cormany | 172/126 |
| 3,556,226 A | * | 1/1971 | Brewer et al. | 172/130 |
| 3,666,019 A | | 5/1972 | Yeske | |
| 4,207,950 A | | 6/1980 | Kinzenbaw | |
| 4,365,672 A | * | 12/1982 | Robinson et al. | 172/2 |
| 4,449,590 A | | 5/1984 | Williamson | |
| 4,488,476 A | * | 12/1984 | Diel et al. | 91/513 |
| 4,526,235 A | * | 7/1985 | Kinzenbaw | 172/126 |
| 4,530,405 A | * | 7/1985 | White | 172/126 |
| 4,700,784 A | * | 10/1987 | Wiebe et al. | 172/126 |
| 4,986,367 A | | 1/1991 | Kinzenbaw | |
| 5,379,847 A | | 1/1995 | Snyder | |
| 5,408,756 A | | 4/1995 | Wahls | |
| 5,542,190 A | * | 8/1996 | Wahls | 33/624 |
| 5,577,563 A | | 11/1996 | Holen | |
| 5,992,534 A | | 11/1999 | Callies et al. | |
| 6,334,491 B1 | | 1/2002 | Nevin | |
| 6,397,952 B1 | * | 6/2002 | Hundeby | 172/126 |
| 6,820,699 B1 | | 11/2004 | Bettin | |
| 2002/0189826 A1 | | 12/2002 | Beaujot | |

* cited by examiner

*Primary Examiner*—Thomas B Will
*Assistant Examiner*—Matthew D Troutman
(74) *Attorney, Agent, or Firm*—Rebecca L. Henkel; John William Stader (57) ABSTRACT

A folding marker for connection to an agricultural implement toolbar with a marker shoulder pivot, an inner arm and a double acting hydraulic cylinder both pivotally connected to the shoulder pivot. A middle arm bracket is pivotally connected to the inner arm and the cylinder. A middle arm is connected to the middle arm bracket, with two beams extending from the bracket and terminating at an outer arm pivot, with a third beam connected between the bracket and a crossbrace. An outer arm pivot bracket is pivotally connected to the outer arm pivot, an outer arm connected thereto and having two legs connected between the outer arm pivot bracket and a plate assembly. The legs define a channel therebetween, and an adjustable arm is slidably connected within the channel. An extension element is insertable within the channel and lockable with the plate assembly, with a marking element connected thereto.

3 Claims, 8 Drawing Sheets

METHOD AND APPARATUS FOR A FOLDING MARKER FOR AN AGRICULTURAL IMPLEMENT

FIELD OF THE INVENTION

The present invention relates to a marker system for an agricultural implement. More particularly, the present invention relates to a marker system which is suitable for use with a large, multiple row planter.

BACKGROUND OF THE INVENTION

Agricultural work vehicles, such as tractors or combines or other agricultural harvesting machines, are known to tow implements that perform (or include tool bar(s) that perform) one or more functions, such as plowing, planting or seeding, fertilizing, and harvesting in a field. Also, it is known for agricultural work vehicles to employ one, two or more folding markers that typically are extendable beyond the perimeter of the work vehicle and create markings by, for example, gouging furrows in the field adjacent to the vehicle. Such markers are typically attached to the implement towed by the work vehicle, although they may be attached to the work vehicle itself. Since an agricultural work vehicle typically traverses a field in a systematic row-by-row format, the markers often are used to create markings in the field to indicate to the operator of the vehicle a path for the next row. Markers are often, though not necessarily, installed in pairs on both sides of an agricultural work vehicle. Also, some agricultural work vehicles include more than one marker that can extend from a given side of the vehicle. For example, an agricultural work vehicle can include both inner and outer markers, where the outer markers are employed to provide markings at relatively larger distances from the work vehicle, and the inner markers are employed to provide markings at relatively smaller distances from the work vehicle.

With respect to most agricultural work vehicles, it is necessary for the work vehicles to have the capability of raising and lowering the implements (or tool bars of the implements) and markers with respect to the work vehicles and the ground. For example, a typical agricultural work vehicle proceeding through a field in a row-by-row, or more commonly a multiple row-by-row, manner must turn around at the end of each row in order to proceed down the successive row. While turning around, it is sometimes appropriate to raise the implement (or the tool bar of the implement) towed by the agricultural work vehicle some distance above the ground to prevent the implement from acting upon (or damaging) the ground or crops outside the lines of the rows. Similarly, it is common that the markers attached to an implement of a work vehicle be raised some distance above the ground while the work vehicle is turning around to prevent improper marking, damage to the ground or crops, or damage to the markers themselves that might occur if the markers encountered obstacles such as fences, trees, and boulders.

Often it is necessary not only that the markers themselves be raised but also that the implementation of the markers be changed while the work vehicle is turning around. For example, while it may be appropriate to utilize markers on both sides of a work vehicle as it first enters and makes its initial crossing of a field so as to create row markings on both sides of the work vehicle, implementation of markers on both sides of the work vehicle is no longer appropriate once it has completed its first row. Instead, it is then appropriate to utilize a marker only on one side of the work vehicle so that, as the vehicle proceeds down one of the two paths marked during its initial crossing of the field, a new row marking parallel to the previous row markings is created only in that section of the field that has not yet been traversed by the work vehicle. Insofar as a work vehicle needs to turn around regularly as it advances row-by-row through a field, it is appropriate to alternate the implementation of the markers used to create row markings so that new row markings are always created in that section of the field that has not yet been traversed by the work vehicle.

Because it is often appropriate for the markers and implement/tool bar of an agricultural work vehicle to be raised and lowered at the same time, some conventional agricultural work vehicles actuate the raising and lowering of their markers and implements/tool bars using the same hydraulic valve. Such a single-valve system is simple and inexpensive to install on an agricultural work vehicle. However, in some agricultural work vehicles, it is desirable to have the capability of controlling the raising and lowering of markers independently of the raising and lowering of the implements/tool bars. For example, in the case of planters, it often is desirable to have the capability of raising and lowering markers, for reasons such as those discussed above (e.g., to avoid damage to the markers), without simultaneously raising and lowering the implements/tool bars of the planters, which would interrupt the planting operation. Some conventional planters, as well as other conventional agricultural work vehicles that need to provide such independent control of the markers and implements/tool bars, provide such independent control through the use of two (or more) different hydraulic valves for separately actuating the different devices.

Some of the challenges associated with modern marking systems are associated with the size of multi-row planters. Multi-row planters can extend a planting width of sixty feet, for example, or lesser or greater, with variable planting unit spacing of fifteen, twenty and thirty inches, or other spacing. Folding markers for a sixty foot wide planter therefore are required to extend thirty feet, for example, when marking. The length of the marker creates moment arm (foot-lbs.) and other self weight loading, which the folding marker must sustain while at the same time must be economical to manufacture. Additionally, if the folding marker hits an obstruction, additional moment arm (foot-lbs.) loading is created which is proportional to the length of the folding marker. Simply making a marker more heavier with stronger supports may be counter productive in that this can increase the self weight loading and also increase the operating expense of the planter as it now takes more fuel to tow the planter through the field.

The speed of raising and lowering the folding marker can also be a concern as a fast moving folding or unfolding operation may provide a high dynamic load on the marker, whereas a slow moving folding or unfolding operation may not be particularly tolerable by the operator.

Additionally, and as mentioned above, it is common for marker actuation to alternate as the operator makes successive turns at the ends of a field. Such alternation can complicate the operation of the agricultural implement if done manually. The raising and lowering of the folding marker can also be complicated by the length of the marker. The moment arm loading is also present during folding and unfolding of the marker, and it is important to avoid a runaway load situation during folding and unfolding of the marker.

Accordingly, what is needed in the art is a folding marker suitable for use with the large width agricultural planters, or other agricultural implements used therewith, which can sustain the loading associated with relatively large size of the marker while being economical to manufacture and operate.

Additionally, it is desired that the folding marker can accommodate hitting an obstruction, without damaging the folding marker. Yet further, it is desired to avoid a runaway load situation during folding and unfolding of the marker, and make the alternating folding and unfolding of the marker be automatic.

SUMMARY OF THE INVENTION

The invention comprises, in one form thereof, a folding marker for connection to a toolbar of an agricultural implement which includes a marker shoulder pivot configured for connection to the toolbar, an inner arm pivotally connected to the marker shoulder pivot, and a double acting hydraulic cylinder pivotally connected to the marker shoulder pivot and connected approximately in parallel with the inner arm. A middle arm bracket is pivotally connected to the inner arm and the double acting hydraulic cylinder. A middle arm is connected to the middle arm bracket, the middle arm including a first beam and a second beam extending from the middle arm bracket and terminating at an outer arm pivot, a crossbrace connected between the first beam and the second beam, and a third beam connected between the middle arm bracket and the crossbrace. An outer arm pivot bracket is pivotally connected to the outer arm pivot. An outer arm is connected to the outer arm pivot bracket, the outer arm having a first leg and a second leg each connected at one end to the outer arm pivot bracket, and the first leg and the second leg are connected at an other end to a plate assembly. The first leg and the second leg define a channel therebetween, and an adjustable arm assembly is slidably connected within the channel. The adjustable arm assembly includes an extension element insertable within the channel and lockable along the extension element with the plate assembly, and a marking element connected to the extension element.

In other aspects, the outer arm pivot bracket includes a platform connected to the outer arm pivot and a cable brace extending from the platform. A channel plate assembly can be pivotally connected to the cable brace, with a cable bracket connected to the inner arm, and a cable connected between the channel plate assembly and the cable bracket. The present invention can further include a spring, or other resilient member, in line with the cable.

In one form, the middle arm bracket includes a breakaway pivot and a breakaway bolt mechanism opposite thereto. The breakaway bolt mechanism can include a bolt on a forward direction of travel side of the middle arm bracket, the bolt configured for breaking when the folding marker hits an obstruction creating a load condition on the bolt which exceeds a predetermined load value which breaks the bolt, at which point the middle arm pivots about the breakaway pivot when the bolt breaks.

In yet other aspects, an assist wheel is connected to the middle arm on the same side as the breakaway pivot, and a marker stop can be connected to the middle arm.

The invention comprises, in another form thereof, an agricultural implement which includes a toolbar and a folding marker connected to an end of the toolbar. The folding marker has a marker shoulder pivot configured for connection to the toolbar, an inner arm pivotally connected to the marker shoulder pivot, and a double acting hydraulic cylinder pivotally connected to the marker shoulder pivot and connected approximately in parallel with the inner arm. A middle arm bracket is pivotally connected to the inner arm and the double acting hydraulic cylinder. A middle arm is connected to the middle arm bracket, the middle arm including a first beam and a second beam extending from the middle arm bracket and terminating at an outer arm pivot, a crossbrace connected between the first beam and the second beam, and a third beam connected between the middle arm bracket and the crossbrace. An outer arm pivot bracket is pivotally connected to the outer arm pivot. An outer arm is connected to the outer arm pivot bracket, the outer arm having a first leg and a second leg each connected at one end to the outer arm pivot bracket, and the first leg and the second leg are connected at an other end to a plate assembly. The first leg and the second leg define a channel therebetween, and an adjustable arm assembly is slidably connected within the channel. The adjustable arm assembly includes an extension element insertable within the channel and lockable along the extension element with the plate assembly, and a marking element connected to the extension element.

In other aspects the agricultural implement can have the outer arm pivot bracket with a platform connected to the outer arm pivot and a cable brace extending from the platform. A channel plate assembly can be pivotally connected to the cable brace, with a cable bracket connected to the inner arm, and a cable connected between the channel plate assembly and the cable bracket. The present invention can further include a spring, or other resilient member, in line with the cable.

In one form of the agricultural implement, the middle arm bracket includes a breakaway pivot and a breakaway bolt mechanism opposite thereto. The breakaway bolt mechanism can include a bolt on a forward direction of travel side of the middle arm bracket, the bolt configured for breaking when the folding marker hits an obstruction creating a load condition on the bolt which exceeds a predetermined load value which breaks the bolt, at which point the middle arm pivots about the breakaway pivot when the bolt breaks.

In yet other aspects of the agricultural implement, an assist wheel is connected to the middle arm on the same side as the breakaway pivot, and a marker stop can be connected to the middle arm.

The agricultural implement according to the present invention can further include a hydraulic system in fluid communication with the double acting hydraulic cylinder, and the hydraulic system has a marker valve assembly with a fixed orifice in an inlet of the marker valve assembly, the fixed orifice controlling a lift speed and a lower speed of the folding marker.

A second folding marker can be connected to an other end of the toolbar, where the second folding marker includes a second double acting hydraulic cylinder. Further, the hydraulic system includes a first poppet type solenoid valve in fluid communication with the double acting hydraulic cylinder and a second poppet type solenoid valve plumbed in parallel with the first poppet type solenoid valve and in fluid communication with the second double acting hydraulic cylinder.

In other forms, the agricultural implement includes an electronics module, wherein the hydraulic system has a pressure switch connected to the electronics module. The pressure switch senses when a pressure at an input of the first poppet type solenoid valve and the second poppet type solenoid valve reaches a predetermined value, the combination of electronics module and the pressure switch causing one of the solenoid valves to energize and the other solenoid valve to de-energize providing automatic alternating marker operation.

Each of the double acting hydraulic cylinder and the second double acting hydraulic cylinder can include a rod end. The hydraulic system includes in fluid communication with each rod end a check valve in parallel with an orifice to restrict flow in one flow direction to allow a respective folding marker to stop without slamming down on a marker stop during lowering of the respective folding marker.

The agricultural implement can be multi-row planter including a plurality of row units connected to the toolbar, or other agricultural implements such as a cultivator, a combine, a harvester, and/or a fertilizer implement.

The invention comprises, in yet another form thereof, a method of manufacturing a folding marker for connection to a toolbar of an agricultural implement, comprising the steps of: providing a marker shoulder pivot configured for connection to the toolbar, an inner arm pivotally connected to the marker shoulder pivot, a double acting hydraulic cylinder pivotally connected to the marker shoulder pivot and connected approximately in parallel with the inner arm, a middle arm bracket pivotally connected to the inner arm and the double acting hydraulic cylinder; fabricating a middle arm including a first beam and a second beam extending from the middle arm bracket and terminating at an outer arm pivot, a crossbrace connected between the first beam and the second beam, and a third beam connected between the middle arm bracket and the crossbrace; connecting the middle arm to the middle arm bracket; assembling an outer arm pivot bracket pivotally connected to the outer arm pivot; forming an outer arm connected to the outer arm pivot bracket, the outer arm having a first leg and second leg each connected at one end to the outer arm pivot bracket, the first leg and the second leg connected at an other end to a plate assembly, the first leg and the second leg defining a channel therebetween; and slidably connecting an adjustable arm assembly within the channel, the adjustable arm assembly including an extension element insertable within the channel and lockable along the extension element with the plate assembly.

The method can further include the step of tensioning a cable between a channel plate assembly and a cable bracket, the outer arm pivot bracket having a platform connected to the outer arm pivot and a cable brace extending from the platform, where the channel plate assembly is pivotally connected to the cable brace, and the cable bracket is connected to the inner arm.

The invention comprises, in yet another form thereof, method of actuating at least one folding marker for connection to a toolbar of an agricultural implement, comprising the steps of: providing a double acting hydraulic cylinder connected to at least one arm of a first folding marker; fluidly communicating a hydraulic system with the double acting hydraulic cylinder, the hydraulic system having a marker valve assembly including a fixed orifice in an inlet of the marker valve assembly; and controlling a lift speed and a lower speed of the folding marker using the fixed orifice.

The method can further include a second folding marker connected to an other end of the toolbar, where the second folding marker has a second double acting hydraulic cylinder, and further including the step of plumbing in parallel a first poppet type solenoid valve in fluid communication with the double acting hydraulic cylinder and a second poppet type solenoid valve in fluid communication with the second double acting hydraulic cylinder.

In other aspects, the method further includes a pressure switch connected to the electronics module, and the method includes the steps of sensing a pressure with the pressure switch at an input of the first poppet type solenoid valve and the second poppet type solenoid valve reaching a predetermined value; and energizing one of the solenoid valves with the combination of electronics module and the pressure switch, and de-energizing the other of the solenoid valves to provide automatic alternating folding marker operation.

In some forms, each of the double acting hydraulic cylinder and the second double acting hydraulic cylinder includes a rod end, and the hydraulic system includes in fluid communication with each rod end a check valve in parallel with an orifice. The method can further including the step of restricting flow in one flow direction to allow a respective folding marker to stop without slamming down on a marker stop during lowering of the respective folding marker.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE PREFERRED EMBODIMENT

Figure 1:
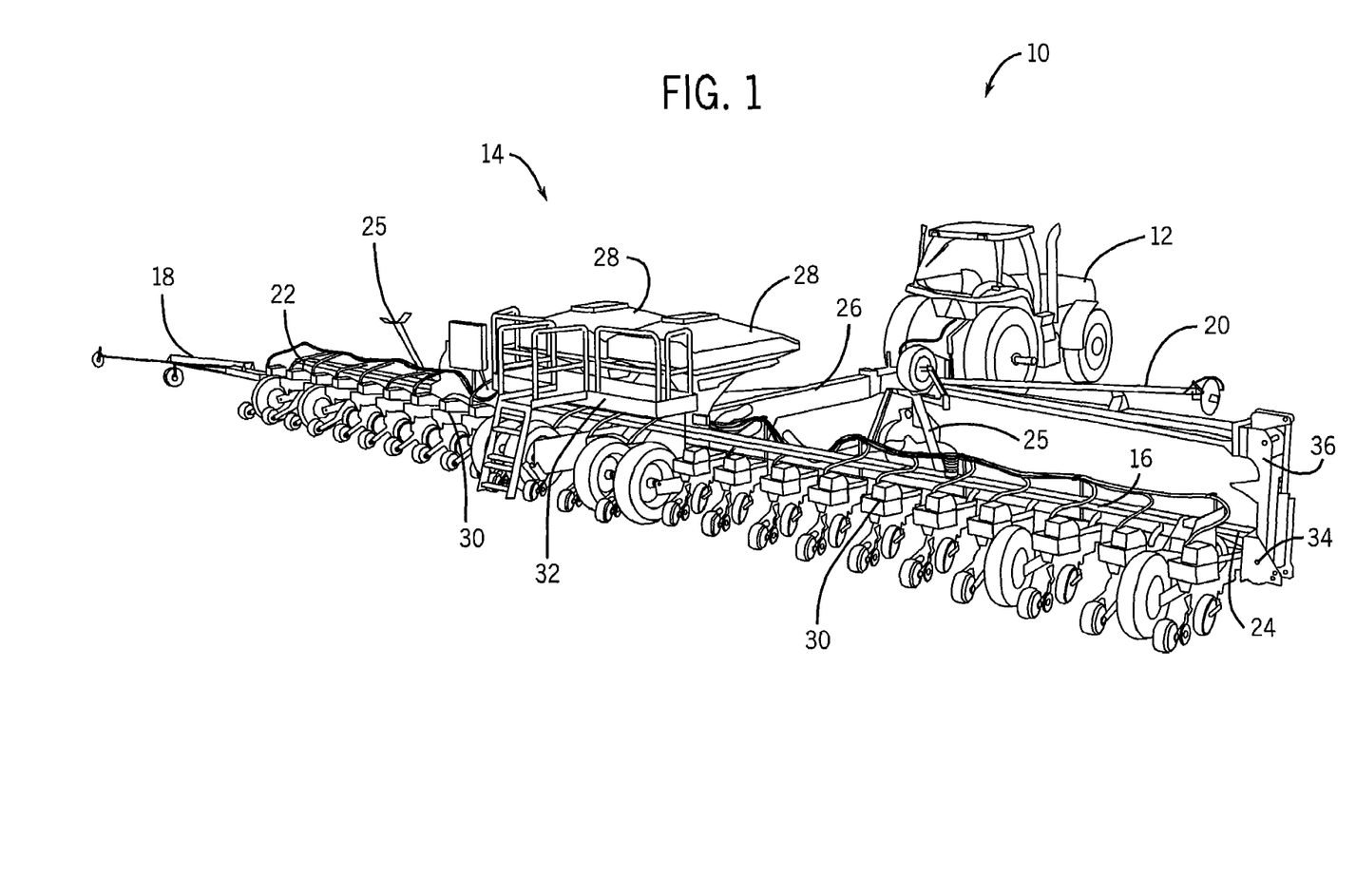
FIG. 1 is a perspective view of an embodiment of an agricultural system including an agricultural implement (planter) with two folding markers according to the present invention, one marker in a marking position and one marker in a folded position.
Figure 2:
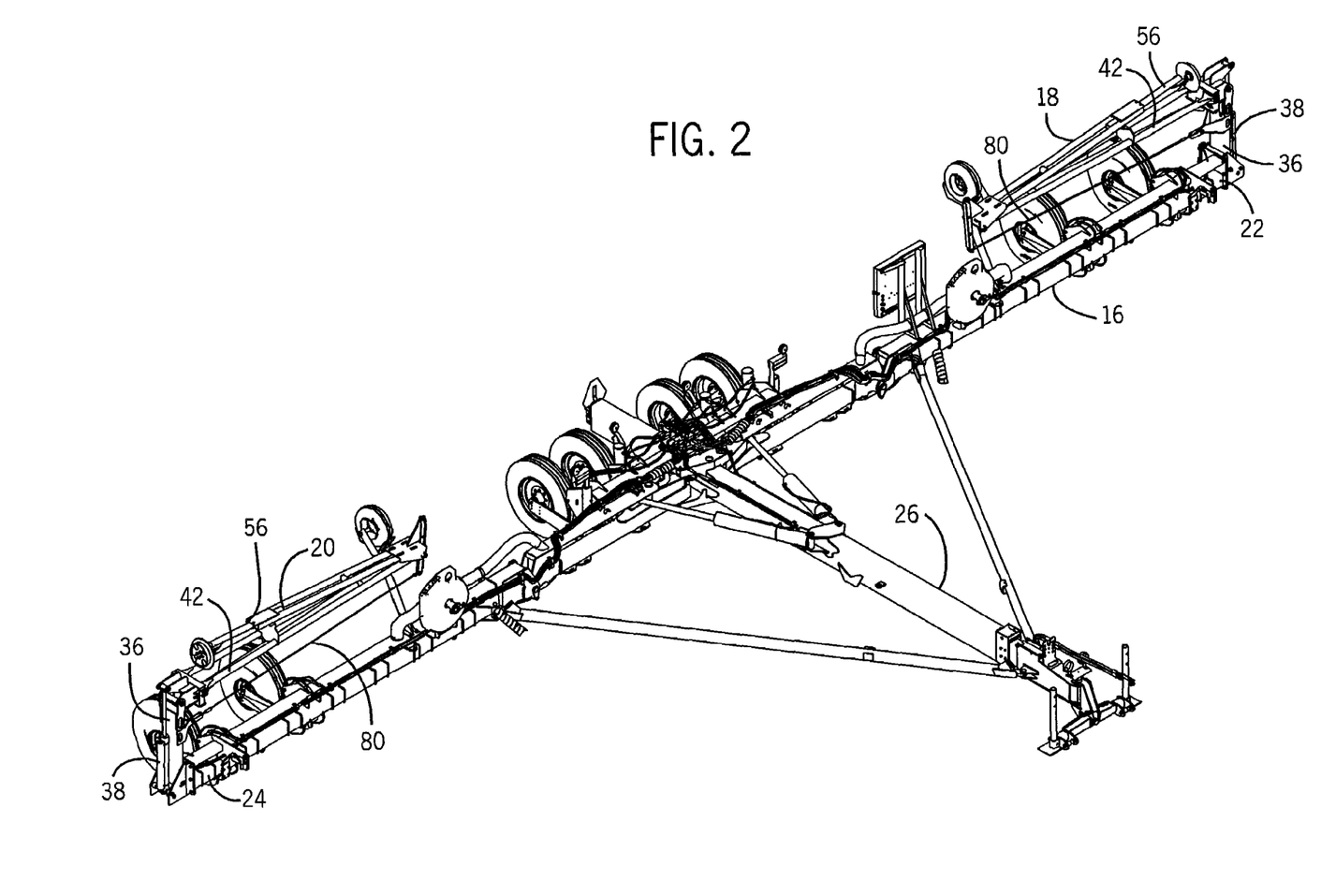
FIG. 2 is a fragmentary perspective view of the planter of FIG. 1, with the row units removed, and with both folding markers in a folding position.
Figure 3:
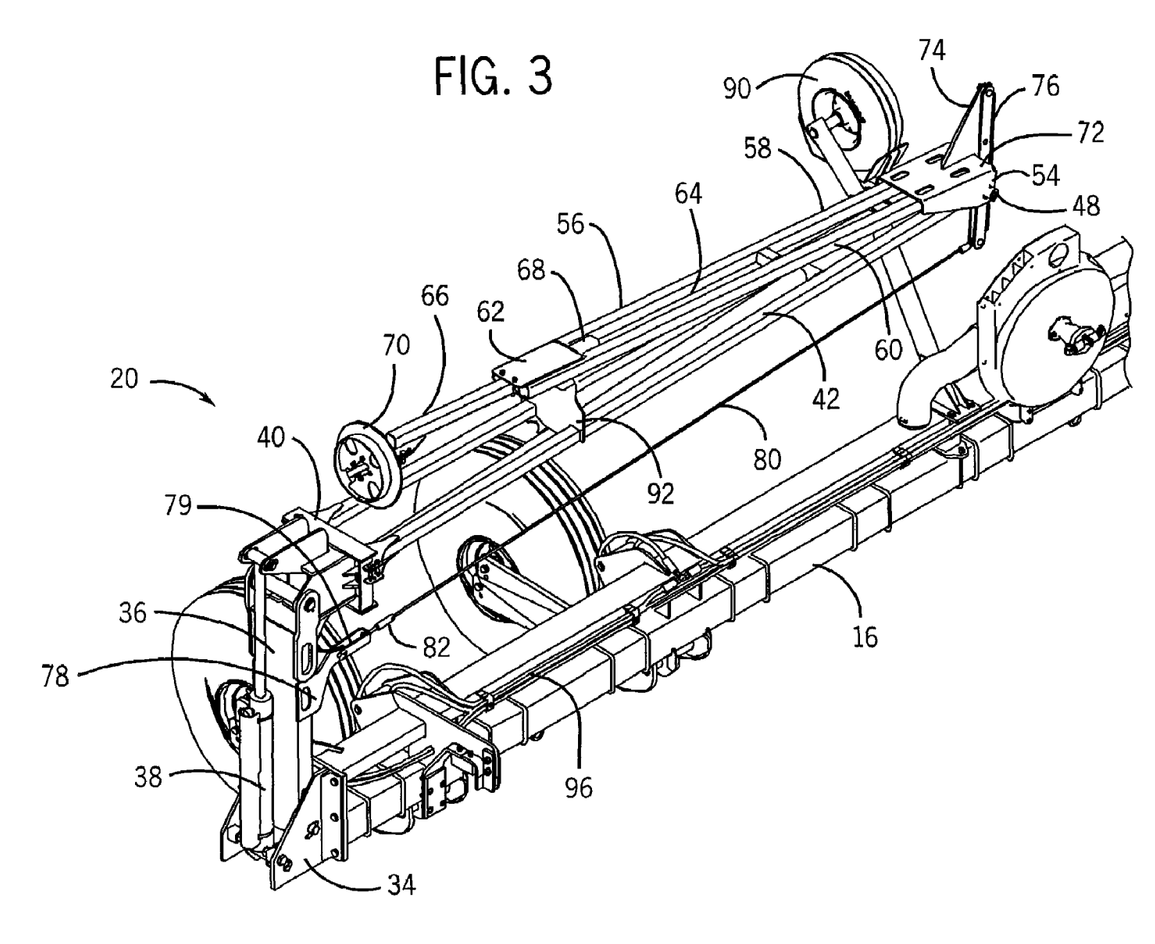
FIG. 3 is a fragmentary perspective view of one end of the planter of FIG. 2, emphasizing a single folded marker.
Figure 4:
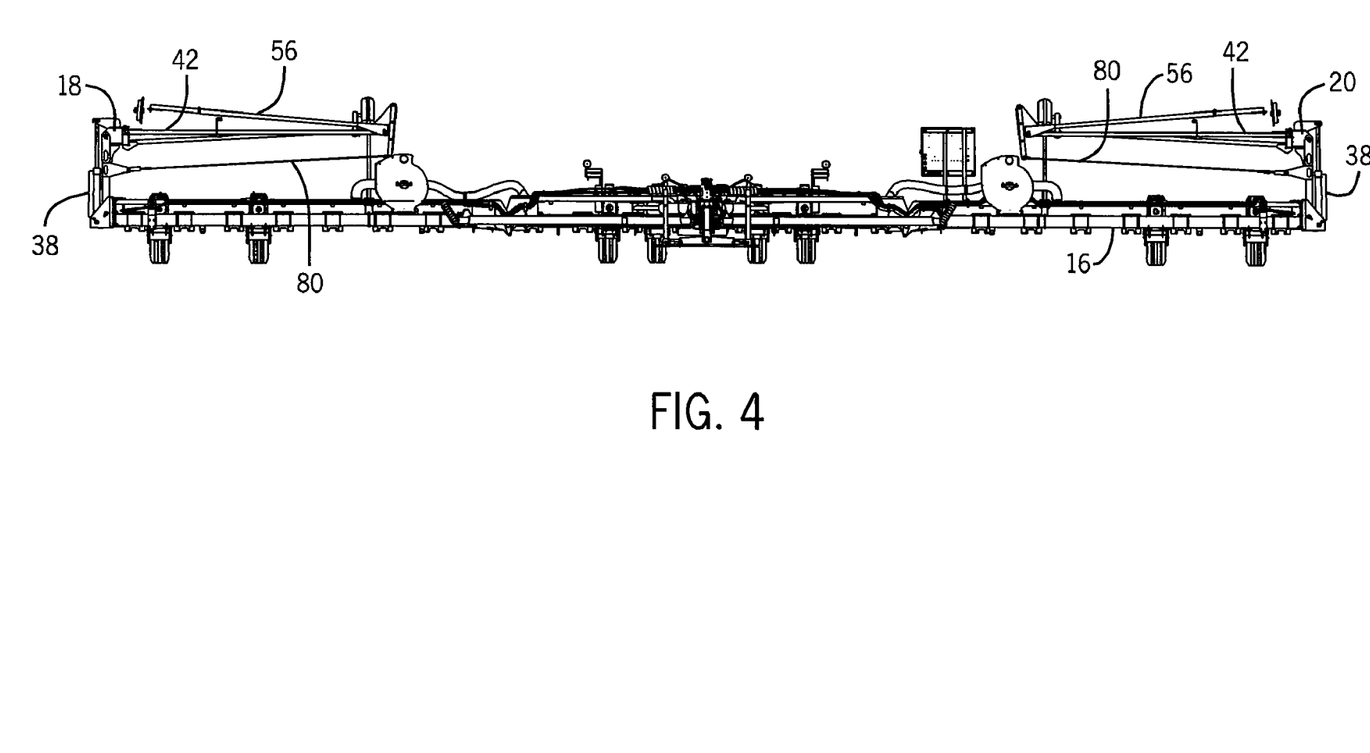
FIG. 4 is a rear view of the planter of FIG. 2.
Figure 5:
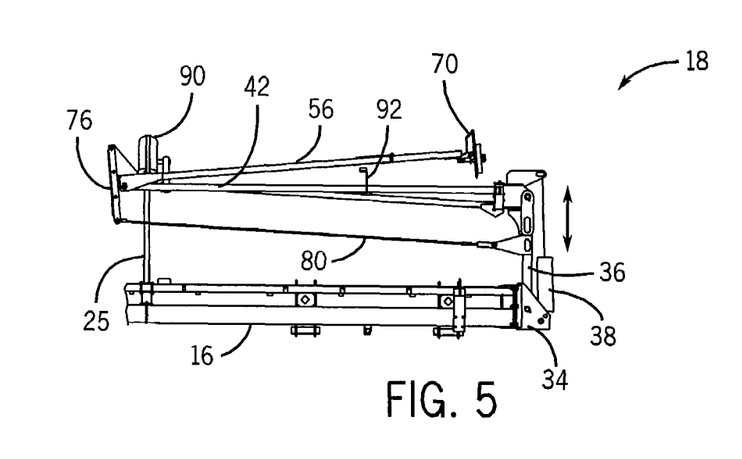
FIG. 5 is a rear view of one of the folding markers of the planter of FIG. 2, in a folded position.
Figure 6:
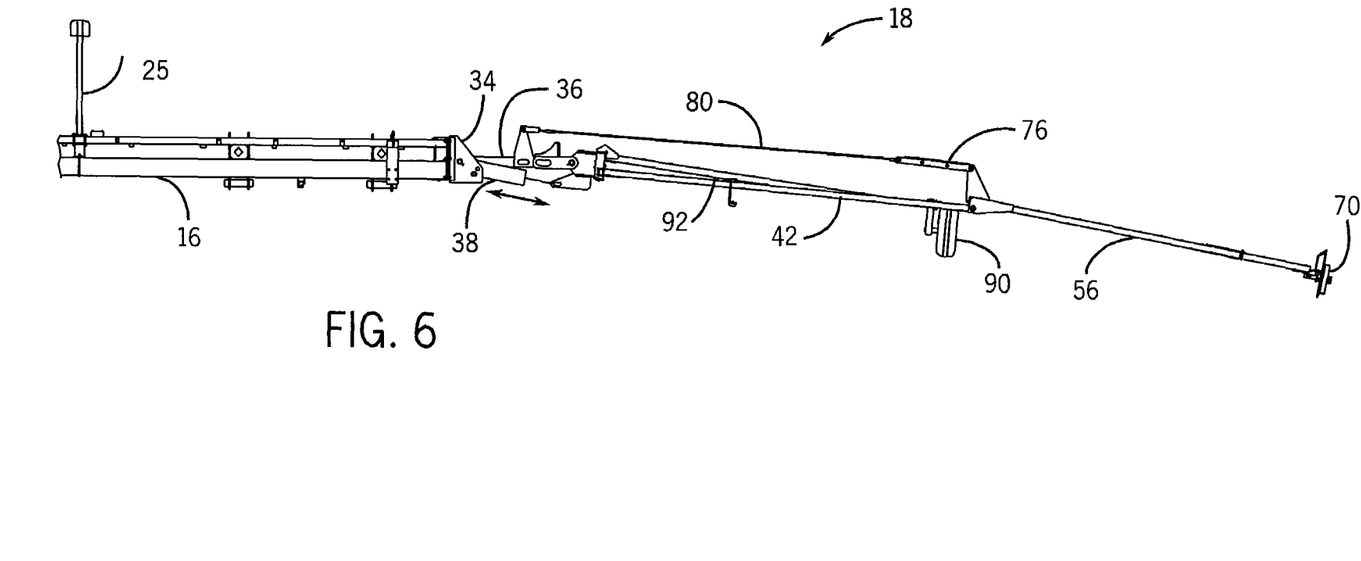
FIG. 6 is a view similar to FIG. 5 but with the folding marker in an extended marking position.

Referring now to the drawings, and more particularly to FIG. 1, there is shown an agricultural work system 10 that includes an agricultural work vehicle, such as tractor 12 that tows an agricultural implement 14, which is depicted as a multi-row pivot transport planter. Planter 14 can include a toolbar 16 with left and right marker assemblies 18, 20 that are attached to left and right ends 22, 24 of toolbar 16, respectively. Supports 25 can support marker assemblies 18, 20 when in a folded position.

Planter 14 can include other elements such as drawbar 26 for connection to tractor 12, large seed tanks 28 which provide seeds to row units 30, and platform and gate assembly 32 for accessing and filling large seed tanks 28. Row or planting units 30 can include a variety of elements for dispensing seed, fertilizer, pesticide, herbicide and other agricultural materials. Such elements can include, but are not limited to, a furrow opening apparatus; gage wheels; a pair of lateral spaced, or staggered, furrow opener discs, or alternatively, and without detracting or departing from the spirit and scope of the present invention, a runner opener type for providing a furrow in the ground; a pair of furrow closer discs, a seed meter, a press wheel arranged in fore-and-aft relationship relative to each other; and a agricultural chemical hopper. Additionally, planter 14 can have planting units 30 with individual seed hoppers instead of large seed tanks 28.

Referring more particularly to FIGS. 2-6, each folding marker 18, 20 includes a marker shoulder pivot 34 configured for connection to one of ends 22, 24 of toolbar 16. An inner arm 36 is pivotally connected to marker shoulder pivot 34, and a double acting hydraulic cylinder 38 is pivotally connected to marker shoulder pivot 34 and is connected approximately in parallel with inner arm 36. A middle arm bracket 40 is pivotally connected to inner arm 36 and the double acting hydraulic cylinder 38.

A middle arm 42 is connected to middle arm bracket 40. Middle arm 42 has a first beam 44 and a second beam 46 (FIGS. 7 and 8) both extending from the middle arm bracket 40 and terminating at an outer arm pivot 48, a crossbrace 50 connected between first beam 44 and second beam 46, and a third beam 52 connected between middle arm bracket 40 and crossbrace 50.

An outer arm pivot bracket 54 is pivotally connected to outer arm pivot 48, and an outer arm 56 is connected to the outer arm pivot bracket 54. Outer arm 56 can have a first leg 58 and second leg 60 each connected at one end to outer arm pivot bracket 54, and legs 58, 60 are connected at their other ends to a plate assembly 62. First and second legs 58, 60 defining a channel 64 therebetween.

An adjustable arm assembly 66 is slidably connected within channel 64. Adjustable arm assembly 66 includes an extension element 68 insertable within channel 64 and lockable along extension element 68 with plate assembly 62. Marking element 70 is connected to extension element 68.

Outer arm pivot bracket 54 includes a platform 72 connected to outer arm pivot 48 and a cable brace 74 extending from platform 72. A channel plate assembly 76 is pivotally connected to cable brace 74, and a cable bracket 78 is connected to inner arm 36. A cable 80 is connected between channel plate assembly 76 and cable bracket 78, at rotating cable channel 79, and channel plate assembly 76 can be used to adjust the tension in cable 80. A spring 82 can be installed in line with cable 80.

Figure 7:
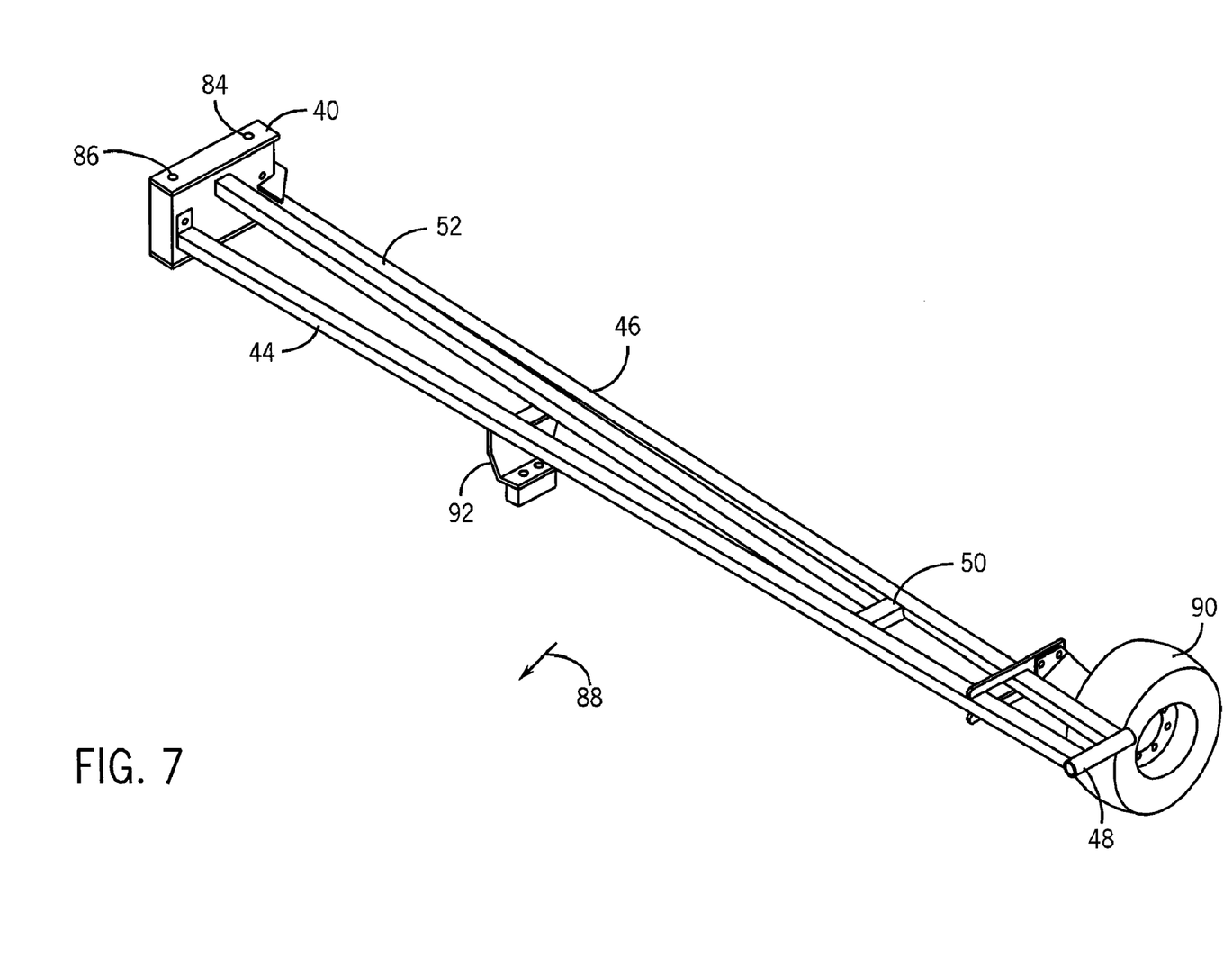
FIG. 7 is a perspective view of an embodiment of a middle arm of the folding marker according to the present invention.
Figure 8:
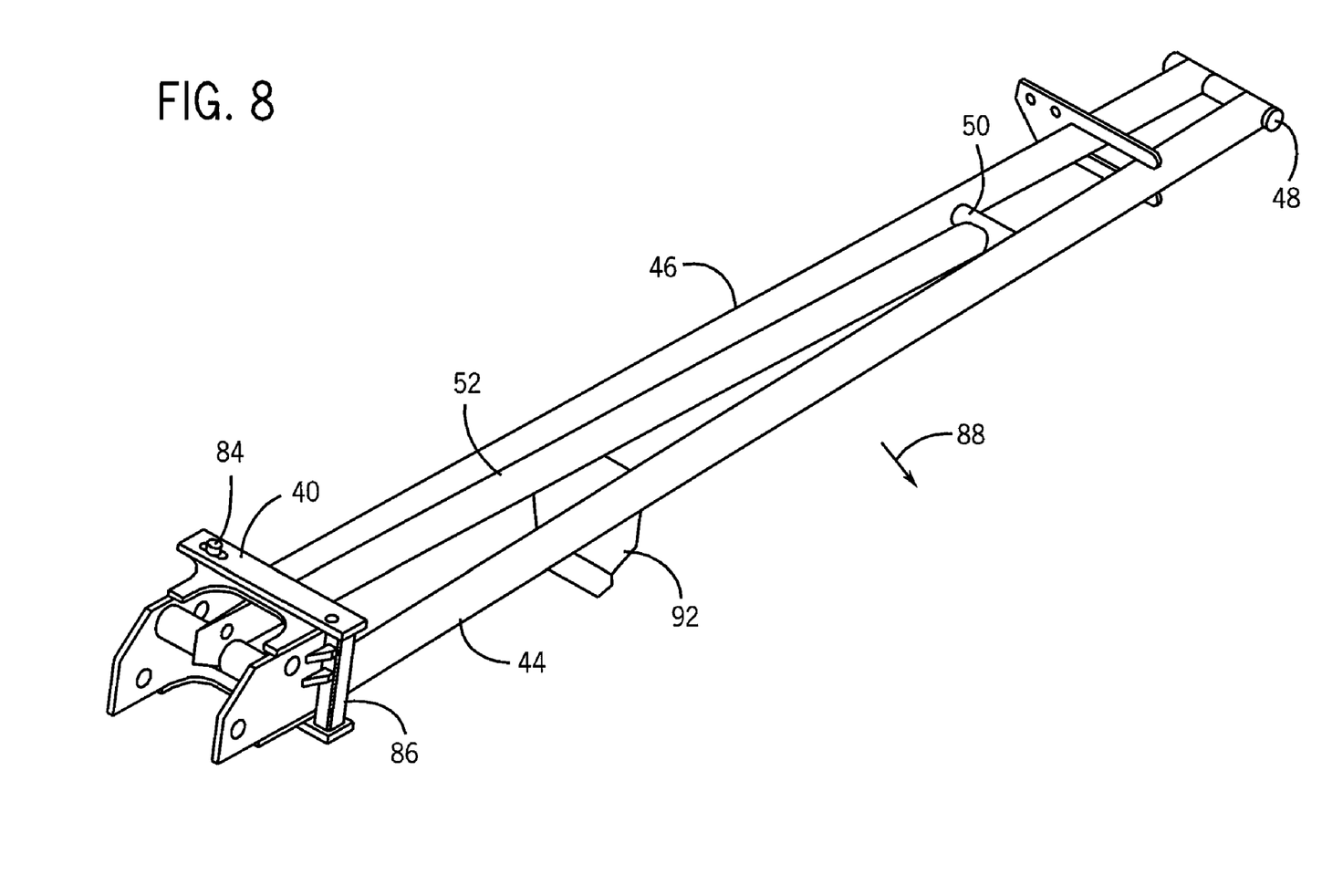
FIG. 8 is another perspective view of the middle arm of FIG. 7.

Referring to FIGS. 7 and 8, middle arm bracket 40 can include a breakaway pivot 84 and a breakaway bolt mechanism 86 opposite thereto. The breakaway bolt mechanism 86 includes a shear bolt on a forward direction of travel 88 side of middle arm bracket 40, and the shear bolt is configured for breaking when the folding marker hits an obstruction creating a load condition on the bolt which exceeds a predetermined load value which breaks the bolt. When the bolt breaks middle arm 42 pivots about breakaway pivot 84.

An assist wheel 90 can be connected to middle arm 42 on a same side as the breakaway pivot 84. Further, a marker stop 92 is connected to middle arm 42 to stop the outer arm 56 when folded.

Figure 9:
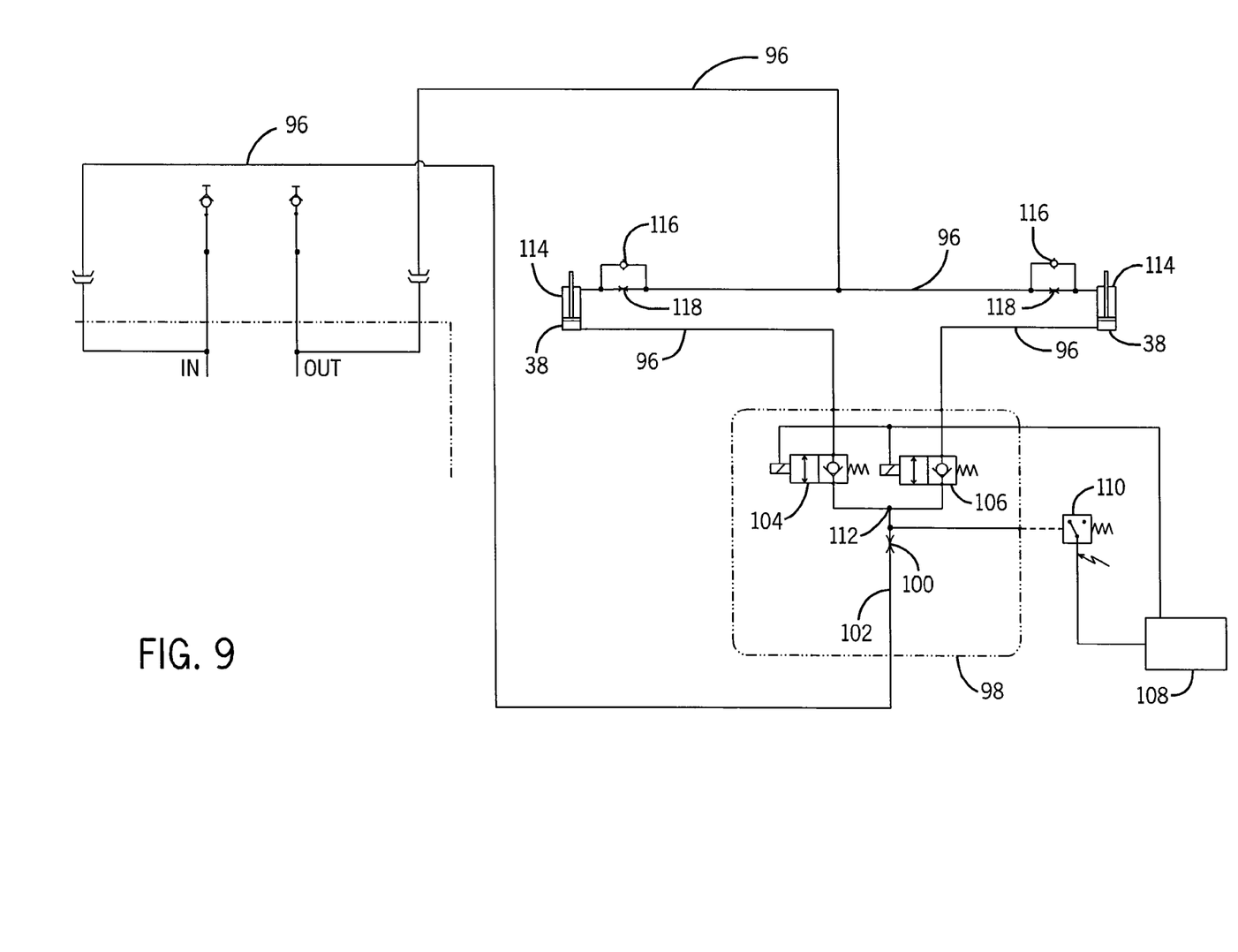
FIG. 9 is a schematic view of an embodiment of a hydraulic/control system according to the present invention.

As shown in FIG. 9, the present invention can include a hydraulic system 94 in fluid communication with double acting hydraulic cylinders 38 through a variety of hydraulic lines 96. Hydraulic system 94 includes a marker valve assembly 98 with a fixed orifice 100 in an inlet 102 of marker valve assembly 98. The fixed orifice 100 controls a lift speed and a lower speed of folding markers 18, 20. Hydraulic flow can be available to the marker valve 98 during the raising of the planter. One tractor auxiliary valve can supply both planter lift and marker function.

Hydraulic system 94 includes a first poppet type solenoid valve 104 in fluid communication with one of cylinders 38 and a second poppet type solenoid valve 106 plumbed in parallel with valve 104 and in fluid communication with the other of cylinders 38. An electronics module 108 can be included wherein hydraulic system 94 includes a pressure switch 110 connected to electronics module 108, such as a microprocessor or other controller, the pressure switch 110 sensing a pressure at an input 112 of valves 104, 106 reaching a predetermined value, the combination of electronics module 108 and pressure switch 110 causing one of the solenoid valves to energize and the other of the solenoid valves to de-energize providing automatic alternating marker operation.

Each of the cylinders 38 includes a rod end 114, and hydraulic system 94 includes in fluid communication with each rod end 114 a check valve 116 in parallel with an orifice 118 to restrict flow in one flow direction to allow a respective folding marker 18, 20 to stop without slamming down on a marker stop 92 during lowering of the respective folding marker 18, 20.

While example embodiments and applications of the present invention have been illustrated and described, including a preferred embodiment, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

We claim:

1. A folding marker for connection to a toolbar of an agricultural implement, comprising:
   a marker shoulder pivot configured for connection to the toolbar;
   an inner arm pivotally connected to the marker shoulder pivot;
   a double acting hydraulic cylinder pivotally connected to the marker shoulder pivot and connected approximately in parallel with the inner arm;
   a middle arm bracket pivotally connected to the inner arm and the double acting hydraulic cylinder;
   a middle arm connected to the middle arm bracket, the middle arm including a first beam and a second beam extending from the middle arm bracket and terminating at an outer arm pivot, a crossbrace connected between the first beam and the second beam, and a third beam connected between the middle arm bracket and the crossbrace;
   an outer arm pivot bracket pivotally connected to the outer arm pivot;
   an outer arm connected to the outer arm pivot bracket, the outer arm having a first leg and a second leg each connected at one end to the outer arm pivot bracket, the first leg and the second leg connected at an other end to a plate assembly, the first leg and the second leg defining a channel therebetween; and
   an adjustable arm assembly slidably connected within the channel, the adjustable arm assembly including an extension element insertable within the channel and lockable along the extension element with the plate assembly, and a marking element connected to the extension element;
   wherein the outer arm pivot bracket includes a platform connected to the outer arm pivot and a cable brace extending from the platform;

further including a channel plate assembly pivotally connected to the cable brace, a cable bracket connected to the inner arm, and a cable connected between the channel plate assembly and the cable bracket;

further including a spring in line with the cable;

wherein the middle arm bracket includes a breakaway pivot and a breakaway bolt mechanism opposite thereto;

wherein the breakaway bolt mechanism includes a bolt on a forward direction of travel side of the middle arm bracket, the bolt configured for breaking when the folding marker hits an obstruction creating a load condition on the bolt which exceeds a predetermined load value which breaks the bolt, the middle arm pivoting about the breakaway pivot when the bolt breaks;

further including an assist wheel connected to the middle arm on a same side as the breakaway pivot;

further including a marker stop connected to the middle arm;

further including a hydraulic system in fluid communication with the double acting hydraulic cylinder, the hydraulic system having a marker valve assembly including a fixed orifice in an inlet of the marker valve assembly, the fixed orifice controlling a lift speed and a lower speed of the folding marker;

further including a second folding marker connected to an other end of the toolbar, the second folding marker including a second double acting hydraulic cylinder;

wherein the hydraulic system includes a first poppet type solenoid valve in fluid communication with the first double acting hydraulic cylinder and a second poppet type solenoid valve plumbed in parallel with the first poppet type solenoid valve and in fluid communication with the second double acting hydraulic cylinder; wherein said first and second poppet type solenoid valves allow continual flow of fluid to said first and second double acting hydraulic cylinder to allow said folding marker to continue to raise after said agricultural implement has been raised for field transport position;

wherein when said first and second poppet type solenoid valves de-energize, flow of fluid continues to said first and second double acting hydraulic cylinders;

further including an electronics module, wherein the hydraulic system includes a pressure switch connected to the electronics module, the pressure switch sensing a pressure at an input of the first poppet type solenoid valve and the second poppet type solenoid valve reaching a predetermined value, the combination of electronics module and the pressure switch causing one of the solenoid valves to energize and the other of the solenoid valves to de-energize providing automatic alternating marker operation wherein each of the first double acting hydraulic cylinder and the second double acting hydraulic cylinder includes a rod end, the hydraulic system includes in fluid communication with each rod end a check valve in parallel with an orifice to restrict flow in one flow direction to allow a respective folding marker to rest on a marker stop during lowering of the respective folding marker.

2. An agricultural implement, comprising:

a toolbar;

a folding marker connected to an end of the toolbar, the folding marker including:

a marker shoulder pivot configured for connection to the toolbar;

an inner arm pivotally connected to the marker shoulder pivot;

a double acting hydraulic cylinder pivotally connected to the marker shoulder pivot and connected approximately in parallel with the inner arm;

a middle arm bracket pivotally connected to the inner arm and the double acting hydraulic cylinder;

a middle arm connected to the middle arm bracket, the middle arm including a first beam and a second beam extending from the middle arm bracket and terminating at an outer arm pivot, a crossbrace connected between the first beam and the second beam, and a third beam connected between the middle arm bracket and the crossbrace;

an outer arm pivot bracket pivotally connected to the outer arm pivot;

an outer arm connected to the outer arm pivot bracket, the outer arm having a first leg and a second leg each connected at one end to the outer arm pivot bracket, the first leg and the second leg connected at an other end to a plate assembly, the first leg and the second leg defining a channel therebetween; and an adjustable arm assembly slidably connected within the channel, the adjustable arm assembly including an extension element insertable within the channel and lockable along the extension element with the plate assembly, and a marking element connected to the extension element;

wherein the outer arm pivot bracket includes a platform connected to the outer arm pivot and a cable brace extending from the platform;

further including a channel plate assembly pivotally connected to the cable brace, a cable bracket connected to the inner arm, and a cable connected between the channel plate assembly and the cable bracket;

further including a spring in line with the cable;

wherein the middle arm bracket includes a breakaway pivot and a breakaway bolt mechanism opposite thereto;

wherein the breakaway bolt mechanism includes a bolt on a forward direction of travel side of the middle arm bracket, the bolt configured for breaking when the folding marker hits an obstruction creating a load condition on the bolt which exceeds a predetermined load value which breaks the bolt, the middle arm pivoting about the breakaway pivot when the bolt breaks;

further including an assist wheel connected to the middle arm on a same side as the breakaway pivot;

further including a marker stop connected to the middle arm;

further including a hydraulic system in fluid communication with the double acting hydraulic cylinder, the hydraulic system having a marker valve assembly including a fixed orifice in an inlet of the marker valve assembly, the fixed orifice controlling a lift speed and a lower speed of the folding marker;

further including a second folding marker connected to an other end of the toolbar, the second folding marker including a second double acting hydraulic cylinder;

wherein the hydraulic system includes a first poppet type solenoid valve in fluid communication with the first the double acting hydraulic cylinder and a second poppet type solenoid valve plumbed in parallel with the first poppet type solenoid valve and in fluid communication with the second double acting hydraulic cylinder; wherein said first and second poppet type solenoid valves allow continual flow of fluid to said first and second double acting hydraulic cylinder to allow said folding marker to continue to raise after said agricultural implement has been raised for field transport position;

wherein when said first and second poppet type solenoid valves de-energize, flow of fluid continues to said first and second double acting hydraulic cylinders;

further including an electronics module, wherein the hydraulic system includes a pressure switch connected to the electronics module, the pressure switch sensing a pressure at an input of the first poppet type solenoid valve and the second poppet type solenoid valve reaching a predetermined value, the combination of electronics module and the pressure switch causing one of the solenoid valves to energize and the other of the solenoid valves to de-energize providing automatic alternating marker operation;

wherein each of the first double acting hydraulic cylinder and the second double acting hydraulic cylinder includes a rod end, the hydraulic system includes in fluid communication with each rod end a check valve in parallel with an orifice to restrict flow in one flow direction to allow a respective folding marker to rest on a marker stop during lowering of the respective folding marker.

3. The agricultural implement of claim 2, wherein said agricultural implement is a multi-row planter including a plurality of row units connected to the toolbar.

* * * * *